(12) United States Patent
Martin

(10) Patent No.: US 9,472,239 B1
(45) Date of Patent: Oct. 18, 2016

(54) CONCURRENT TRANSCODING OF STREAMING VIDEO FOR IMMEDIATE DOWNLOAD

(75) Inventor: Alberto Martin, Kirkland, WA (US)

(73) Assignee: Google Inc., Mountain View, CA (US)

( * ) Notice: Subject to any disclaimer, the term of this patent is extended or adjusted under 35 U.S.C. 154(b) by 83 days.

(21) Appl. No.: 13/430,236

(22) Filed: Mar. 26, 2012

(51) Int. Cl.
*H04N 5/92* (2006.01)
*G11B 27/10* (2006.01)
*H04N 9/804* (2006.01)

(52) U.S. Cl.
CPC ........... *G11B 27/105* (2013.01); *H04N 9/8042* (2013.01)

(58) Field of Classification Search
CPC .... H04N 5/85; H04N 9/8042; G11B 27/105; G11B 27/329; G11B 27/034
USPC ......................................... 386/241, 284, 354
See application file for complete search history.

(56) References Cited

U.S. PATENT DOCUMENTS

| | | | |
|---|---|---|---|
| 8,477,662 B2* | 7/2013 | Schneider ...................... 370/261 |
| 8,965,271 B1* | 2/2015 | Vucurevich .................. 455/3.06 |
| 2005/0114357 A1* | 5/2005 | Chengalvarayan et al. .. 707/100 |
| 2006/0230169 A1* | 10/2006 | Kaplan et al. ................ 709/231 |
| 2006/0242583 A1* | 10/2006 | MacNaughton et al. ..... 715/733 |
| 2006/0259862 A1* | 11/2006 | Adams et al. ................ 715/716 |
| 2007/0019540 A1* | 1/2007 | Biswas et al. ................ 370/217 |
| 2008/0254740 A1* | 10/2008 | Tofigh et al. ................ 455/3.01 |
| 2010/0034257 A1* | 2/2010 | Sedeffow .................. 375/240.01 |
| 2012/0069028 A1* | 3/2012 | Bouguerra ..................... 345/473 |
| 2012/0141092 A1* | 6/2012 | Friedman ....................... 386/248 |
| 2012/0317299 A1* | 12/2012 | Sathianathan et al. ........ 709/231 |
| 2013/0125175 A1* | 5/2013 | Hao et al. ........................ 725/62 |
| 2013/0188932 A1* | 7/2013 | Hartley ........................... 386/282 |
| 2013/0194431 A1* | 8/2013 | O'Connor et al. ............ 348/159 |

OTHER PUBLICATIONS

Transloadit, http://transloadit.com/blog/2010/12/realtime-encoding-over-150x-faster, Mar. 16, 2012, 5 pages.
Transcoding, Wikipedia, http://en.wikipedia.org/wiki/Transcoding, Jan. 31, 2012, 3 pages.
Videoconferencing, Wikipedia, http://en.wikipedia.org/wiki/Videoconferencing, Jan. 31, 2012, 16 pages.
Transloadit, http://transloadit.com/docs/video-encode, /video/encode/robot/, Mar. 16, 2012, 13 pages.

\* cited by examiner

*Primary Examiner* — William Tran
(74) *Attorney, Agent, or Firm* — Fenwick & West LLP

(57) ABSTRACT

Aspects relate to transcoding a video at substantially the same time as the video is streamed so that upon completion of streaming, the transcoded video is available for immediate download. The transcoding can be performed on a client device or on a host device. Portions of the video can be tagged such that only the tagged portions are transcoded and made available for downloading. The tagged portions can be merged into a single file. Notification of the availability of the video can be broadcast. The broadcast can be controlled so as to be a public notification or a selective notification that is broadcast to a specified set or sets of individuals. Further, video chats can be recorded and compared so that a downloaded version of the video chat is an enhanced version of the information rendered on a user device.

15 Claims, 10 Drawing Sheets

1

CONCURRENT TRANSCODING OF STREAMING VIDEO FOR IMMEDIATE DOWNLOAD

TECHNICAL FIELD

This disclosure relates to concurrent transcoding of streaming video so that the video is available for immediate download.

BACKGROUND

Many users of mobile devices record video and related audio content to memorialize a variety of events in order for those events to be experienced by others that were not able to be physically present at the event.

For conventional recording of streaming video, upon receiving a request to record the streaming video, the video is recorded and then transcoded to convert the video into a format that can be supported by the device. If the video is to be published, the video is transcoded a second time in order for the video to be published in a format acceptable for download. For example, when a remote host session is accessed and then recorded, an encoder allows for viewing of the video on the user device. If the session is to be published, the session is sent locally to disk and then needs to be uploaded for publishing. The process of transcoding the video twice needlessly consumes resources, such as processing power and system memory, and can also frustrate the user because of the amount of time it takes to publish the video.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope of particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with performing video streaming and transcoding in parallel or at substantially the same time. Transcoding the video while the video is being streamed allows the video to be available for immediate download to one or more target devices.

An embodiment relates to a device that includes a memory and a processor. The memory stores computer executable components and the processor executes the computer executable components stored in the memory. The computer executable components include a communication component that receives a video record request and a capture component that records a video of an event indicated by the video record request. The computer executable components also include a transfer component that streams the video to a host device as the video is being recorded and a conversion component that transcodes at least a portion of the video while the video is being streamed to the host device.

Another embodiment relates to a device that includes a memory and a processor. The memory stores computer executable components that are executed by the processor. The computer executable components include a receiver component that receives, from a target device, a request for a video and an authorization component that allows access to the video based on an identification of the target device. The video can be stored in the memory. The computer executable components also include a communication component that streams the video to the target device and a transformation component that transcodes the video while the video is streamed to the target device.

A further embodiment relates to a method that includes receiving, from a target device, a request for a video. The method also includes allowing access to the video based on an authorization level associated with the target device. Further, the method includes streaming the video to the target device and transcoding the video while the video is being streamed to the target device.

Another aspect relates to a method that includes receiving by a processor of a first device a video record request and recording a video on the first device in response to the video record request. The method also includes streaming to a host device at least a portion of the video as the video is being recorded and transcoding at least a portion of the video while the video is being streamed to the host device.

The following description and the annexed drawings set forth certain illustrative aspects of the disclosure. These aspects are indicative, however, of but a few of the various ways in which the principles of the disclosure may be employed. Other advantages and novel features of the disclosure will become apparent from the following detailed description of the disclosure when considered in conjunction with the drawings.

BRIEF DESCRIPTION OF THE DRAWINGS

Various non-limiting implementations are further described with reference to the accompanying drawings in which.

DETAILED DESCRIPTION

Figure 1:
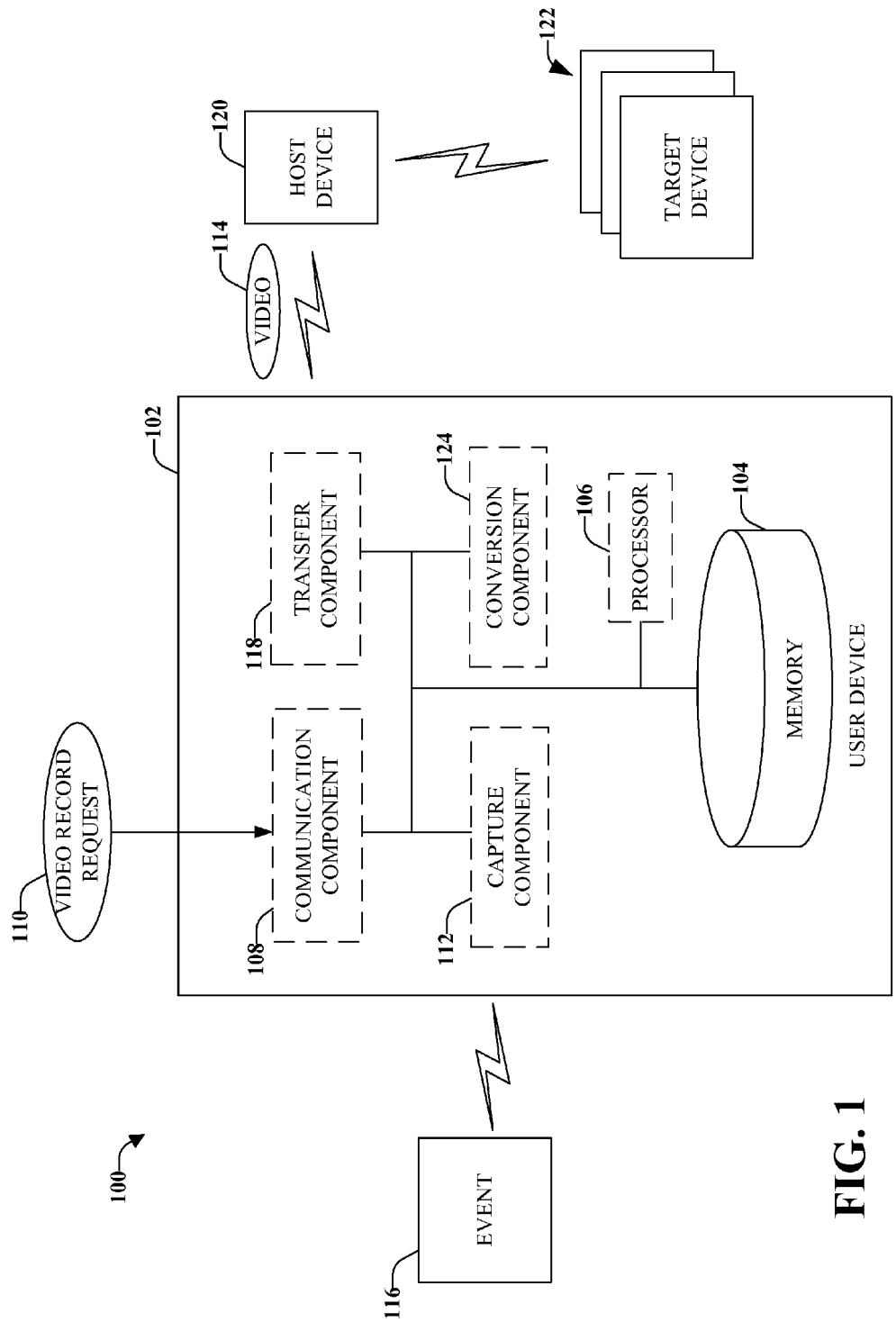
FIG. 1 illustrates an example non-limiting system that provides streaming video in a format that is available for immediate download, according to an embodiment.

Various embodiments or features of the subject disclosure are described with reference to the drawings, wherein like reference numerals are used to refer to like elements throughout. In the following description, for purposes of explanation, numerous specific details are set forth in order to provide a thorough understanding of the subject disclosure. It may be evident, however, that the disclosed subject matter can be practiced without these specific details, or with other methods, components, materials, and so forth. In other instances, well-known structures and components are shown in block diagram form in order to facilitate describing the subject disclosure.

By way of introduction, the subject matter disclosed herein relates to streaming a video, based upon a request for the video. At substantially the same time as the video is being streamed, the video is also being transcoded. The almost simultaneous streaming and transcoding of the video allows for the video to be available for immediate download.

One non-limiting implementation relates to a device that includes a memory that stores computer executable components and a processor that executes the computer executable components stored in the memory. The computer executable components include a communication component that receives a video record request and a capture component that records a video of an event indicated by the video record request. The computer executable components also include a transfer component that streams the video to a host device as the device is being recorded and a conversion component that transcodes at least a portion of the video while the video is being streamed to the host device.

The device, according to an embodiment, also includes an annotation component that bookmarks one or more portions of the video. The bookmark identifies the one or more portions of the video to be transcoded. Further to this embodiment, the conversion component transcodes only the one or more portions of the video that are bookmarked. The system can also include a merge component that aggregates the one or more portions of the video into a single file. Additionally or alternatively, the system can include an indicator module that distinguishes a first portion of the one or more portions from a second portion of the one or more portions. Further to this embodiment, the first portion and the second portion can be contiguous portions of the video or noncontiguous portions of the video.

In an aspect, the event indicated by the video record request is an active video chat session running on the device. In another aspect, the event indicated by the video record request is an active remote hosting session open between the device and another device.

Another implementation relates to a device that includes a memory and a processor. The memory stores computer executable components that are executed by the processor. The computer executable components include a receiver component that receives, from a target device, a request for a video. The video can be stored in the memory. The computer executable components also include an authorization component that allows access to the video based on an identification of the target device. Further, the computer executable components include a communication component that streams the video to the target device and a transformation component that transcodes the video while the video is streamed to the target device.

The device, according to an embodiment, further includes a broadcast component that notifies availability of downloadable content to a set of target devices. The notification can be a general public notification and the set of target devices can represents all devices capable of receiving the notification. Alternatively, the notification can be a selective notification, wherein the set of target devices are selected as a function of at least one configurable parameter.

In an implementation, the receiver component receives a first video from a first user device and a second video from a second user device, wherein the first video and the second video represent alternative views of a single event, e.g., a video chat. Further to this embodiment, the device includes a delta component that identifies differences between the first video and the second video and an enhancement component that creates a third video as a result of the identified differences. The third video is an enhanced version of a combination of the first video and the second video. Further to this aspect, the enhancement component combines frames of the first video with an audio segment of the second video. The device, according to some aspects, further includes an enhancement component that combines the first video with the second video to create a third video and an output component that outputs the third video to the target device in response to the request. The device, according to some aspects, includes an output component that outputs the alternative views in a split-screen format in response to the request for the video. Further to this embodiment, the device can include a synchronization component that harmonizes the alternative views.

Another implementation relates to a method that includes receiving, from a target device, a request for a video. The method also includes allowing access to the video based on an authorization level associated with the target device. Further, the method includes streaming the video to the target device and transcoding the video while the video is streamed to the target device.

According to an implementation, the method can include notification (e.g., push notification) of an availability of downloadable content to a set of devices that includes the target device. Further to this embodiment, the notification can include sending a general public notification to all available devices, including the target device. Alternatively, the notification can include sending a selective notification, wherein the set of target devices are selected as a function of at least one configurable parameter.

The method, according to some embodiments, includes receiving a first video from a first user device and receiving a second video from a second user device. The first video and the second video represent alternative views of a single event. The method also includes identifying differences between the first video and the second video and creating a third video as a result of the identified differences, wherein the third video is an enhanced version of a combination of the first video and the second video.

In another implementation, the method includes receiving a first video from a first user device and receiving a second video from a second user device. The first video and the second video represent alternative views of a single event. Further to this embodiment, the method can include outputting the alternative views for rendering on a display of the target device, wherein the alternative views are rendered in a split-screen format.

A further implementation relates to a method that includes receiving by a processor of a first device a video record request and recording a video on the first device in response to the video record request. The method also includes streaming to a host device at least a portion of the video as the video is being recorded and transcoding at least a portion of the video while the video is being streamed to the host device.

In an implementation, recording a video on the device in response to the video record request includes recording a video of an active remote hosting session between the first device and a second device. In another implementation, recording the video on the device in response to the video record request includes recording a video of an active video chat session between the first device and a second device.

The method, in a further implementation, includes receiving a bookmark identifying one or more portions of the video to be transcoded and transcoding the one or more portions of the video that are bookmarked without transcoding other portions of the video. Further to this implementation, the method includes aggregating the one or more portions of the video into a single file.

Referring initially to FIG. 1, illustrated is an example non-limiting system 100 that provides streaming video in a format that is available for immediate download, according to an embodiment. Generally, when a request to record a streaming video (e.g., a remote hosting session or live video chat session) is received, in order for the video to be published in a format suitable for download, the video has to be transcoded. In some cases, the transcoding of the video, after the request to record the video is received, might be the second time that the video has been transcoded. Transcoding is a direct digital-to-digital data conversion from one type of encoding to another type of encoding. If a target device does not support the format of the video being downloaded, the video is transcoded to a format that is supported by the target device. Transcoding of the video a second time can be time consuming, which can result in user dissatisfaction, perceived negative issues associated with the source of the video, the target device, and so forth. Thus, according to an embodiment, system 100 can be utilized to transcode the video at substantially the same time as the video is being streamed (e.g., to a host device) so that the video can be available for immediate download at the target device.

Various embodiments of the systems, apparatuses, and/or processes explained in this disclosure can constitute machine-executable components embodied within one or more machines, such as, for example, embodied in one or more computer readable mediums (or media) associated with one or more machines. Such component(s), when executed by the one or more machines (e.g., computer(s), computing device(s), virtual machine(s), and so on) can cause the machine(s) to perform the operations described.

System 100 can be included, at least partially, on a user device 102. The user device 102 can be for example, a mobile phone, a desktop computer, a tablet computer, a laptop computer, a gaming device, and other types of communication devices. User device 102 can include a memory 104 that stores computer executable components and instructions. User device 102 can also include a processor 106 that executes the computer executable components stored in the memory 104. It should be noted that although one or more computer executable components may be described herein and illustrated as components separate from memory 104, in accordance with various embodiments, the one or more computer executable components could be stored in the memory 104.

In an embodiment, user device 102 includes a communication component 108 that receives a video record request 110. The video record request 110 can be received based on a manual input from a user. For example, an information technology (IT) help technician may be running a remote hosting session to show a user how to perform a particular task on the user's laptop. This may be a task that the IT technician has had to show other users multiple times before. The IT technician and user may agree, at a certain point in the active remote hosting session, to record parts of the session in a video for upload as a help video. The IT technician or the user may select a button on the user's laptop to convey a recording request and initiate video capture of the remote hosting session open between the user's laptop and the technician's computer. Alternatively, the technician may select a button on the technician's computer and initiate video capture of the remote hosting session open between the technician's computer and the user's laptop. Accordingly, in this example, the user device 102 can be the user's laptop or the technician's computer.

As another example, a college student might be listening to a professor's lecture and would like to record at least a portion of the lecture. Thus, the student can indicate that recording should begin by, for example, pressing a button (e.g., a physical button) on the user device 102, selecting a button (or other visual means) on a user interface display of the user device 102, through voice activation, or through other manners of conveying a recording request. Thus, although not illustrated, the user device 102 can include one or more cameras and one or more speakers, as well as other components that can be utilized to capture the event.

In some embodiments, the video record request 110 can be generated automatically based on defined criteria. In an example, the video record request 110 can be preprogrammed wherein the recording begins on a certain day and time (e.g., May 13 at 7:00 p.m., every Saturday at 10:30 p.m., and so forth) in order to capture an event that occurs (or is expected to occur) at the indicated day/time. Further to this example, the duration of the recording can be predetermined (e.g., 30 minutes, one hour, and so on) or the recoding can continue until an instruction is received to stop the recording (e.g., a manual input from the user).

In some embodiments, the recording can stop based on an incident occurring, such as movement of the user device (intentional or unintentional), which can be detected through a gyroscope, accelerometer, Global Positioning System (GPS), or other means of detecting movement of the user device 102. Additionally or alternatively, the recording can stop based on usage of the user device 102 to perform another function (e.g., answer an incoming communication, initiate an outgoing communication, opening of a browser, and so forth).

In accordance with some embodiments, the recording can start based on detection of movement, detection of a heat source (e.g., infrared), or through other sensing means. For example, a person might wish to record wildlife in their backyard and upload the video for their friends to view. Thus, the person might install trail cameras that detect movement or heat (e.g., of a deer, coyote, bear, or other animal) as the animal passes through an area that can be captured by the trail camera. When the detection occurs, the device (e.g., trail camera) can begin automatic recording for a defined length of time (e.g., two minutes, five minutes, and so on). After (or at substantially the same time as) recording of the video by the camera, the video can be uploaded to a host device (e.g., one or more remote computers). The video is uploaded in such a manner that the video is available for immediate download (e.g., by accessing a website, by sending the video to a target device through electronic means, such as in an email, and so forth).

As a result of the indication that recording should begin (e.g., video record request 110), the communication component 108 sends a notice to a capture component 112 that records a video 114 (and related audio content) of an event 116 (e.g., a remote hosting session, a video chat, a classroom lecture, deer movement in the woods, and so forth). According to some embodiments, at substantially the same time as the event 116 is being recorded by the capture component 112, the video 114 can be viewed on the user device 102 (e.g., though a display or user interface component). The video 114 can be any duration such as, for example, 22 seconds, 3 minutes, 46 minutes, 2 hours, and so forth.

Further, a transfer component 118 can stream the video 114 to a content hosting device (e.g., a host device 120), wherein others (illustrated as target devices 122) can access the video 114 though interaction with the content hosting device. For example, the host device 120 can provide a website or other location that allows others to access videos stored on (or accessible by) the host device 120 (or multiple host devices).

In order for the video 114 to be available for immediate download, user device 102 can include a conversion component 124 that can transcode the video 114 at substantially the same time as the video 114 is being streamed to a display device (e.g., to the user device's display device or to the technician's laptop in the case of the remote hosting session). For example, conversion component 124 can perform a two-step process that involves decoding the video to an intermediate uncompressed format and then encoding the video into a target format. However, other manners of transcoding the video can be employed by conversion component 124.

The host device 120 can retain (e.g., in memory) the video 114 in the transcoded format such that when a request for the video is received from one or more target devices 122, the video is available for immediate download to those target devices 122. The download can begin immediately since the video has already been transcoded and, therefore, a subsequent transcoding process is not needed before the video can be downloaded to the one or more target devices 122.

Figure 2:
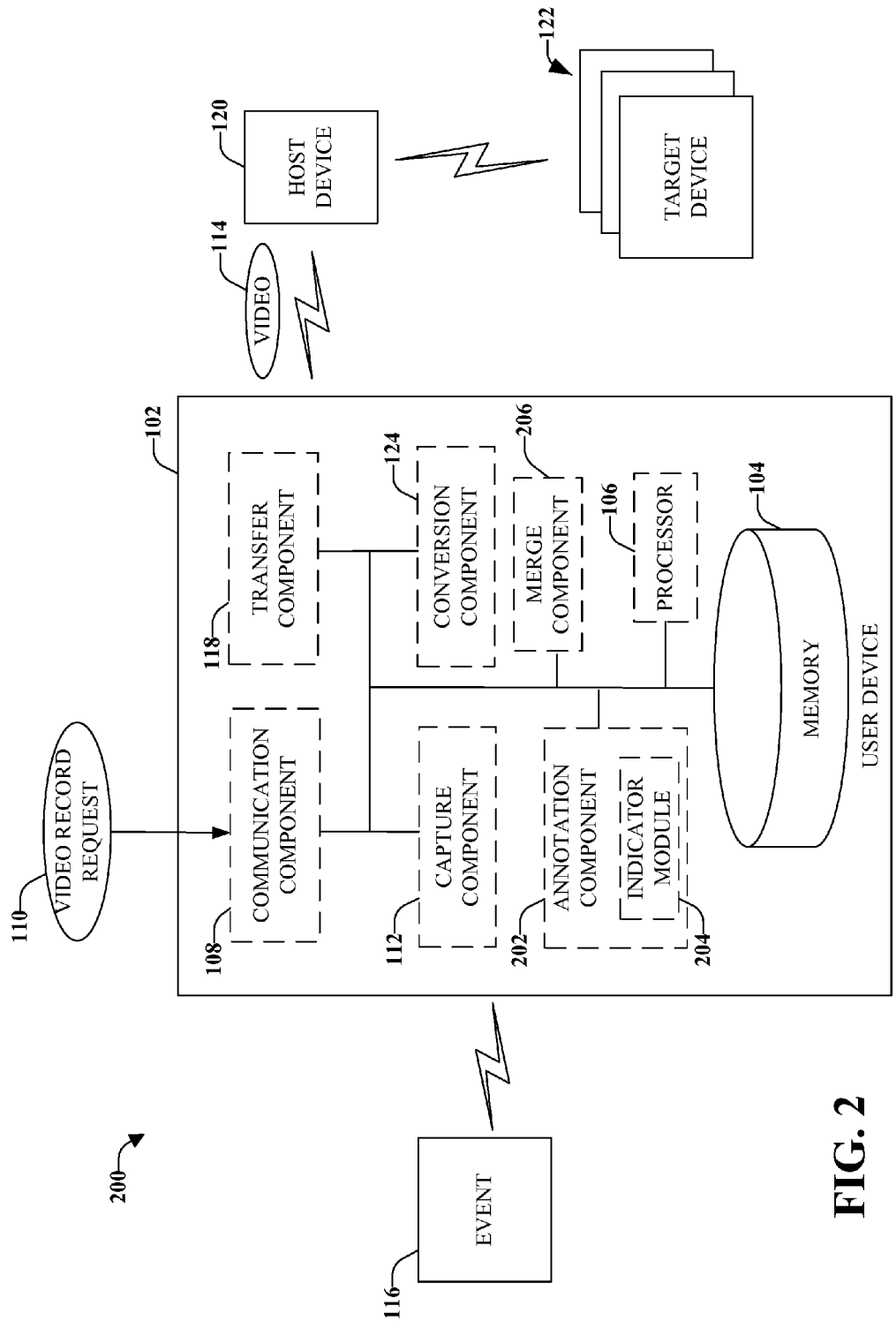
FIG. 2 illustrates an example non-limiting system that provides one or more portions of a video that are available for immediate download, according to an embodiment.

FIG. 2 illustrates an example non-limiting system 200 that provides one or more portions of a video that are available for immediate download, according to an embodiment. The system 200 can include an annotation component 202 that bookmarks at least a portion of the video. The bookmark (sometimes referred to herein as a tag or a marker) identifies at least a portion of the video that is to be transcoded by conversion component 124. The portions of the video that are not bookmarked by annotation component 202 are not transcoded by conversion component 124. Thus, only the bookmarked portion(s) of the video are made available for immediate download at the target device(s) 122.

In accordance with some embodiments, annotation component 202 can tag the one or more portions of the video with markers that indicate where to start and stop the transcoding of the video at about the same time as the video is being streamed. Thus, a single video can have any number of start (transcoding) markers and stop (transcoding) markers, which is a result of how many portions of the video are to be transcoded.

For example, capture component 112 can be recording a lecture that has a duration of three hours. A student in the lecture hall can selectively identify the portions that should be transcoded so that only interesting (or relevant) portions of the lecture are available for immediate download. In such a manner, the three hours lecture can be condensed and the condensed version can be made available for immediate download to the target device(s) 122. In some embodiments, the entire (three hours) lecture remains available (e.g., at the user device 102, at the host device 120), however, only the identified portions are available for immediate download, since those are the portions that have been transcoded.

In accordance with some embodiments, the indication of the portions of the video that should be transcoded can be automatically inferred by system 200 based upon various parameters including user preferences or based on other parameters, such as keywords, phrases, identification of one or more people speaking (e.g., through voice recognition, through physical feature recognition or other biometrics) and so forth. For example, if there is a panel of six speakers at a presentation, the annotation component 202 can be configured to bookmark when each speaker begins and ends their presentation.

In accordance with some embodiments, the annotation component 202 includes an indicator module 204 that provides identifying information associated with each portion of the video that is bookmarked by annotation component 202. The indicator module 204 can distinguish a first portion of the video from a second portion (or other portions) of the video. The first portion and the second portion (or subsequent portions) can be contiguous portions or noncontiguous portions of the video. Continuing the above example, indicator module 204 can include the speaker's name and/or the subject matter of the material being presented. The identifying information can be utilized to jump to relevant portions of the video (e.g., skip over speakers or content that is not of interest to the viewer).

Additionally or alternatively, system 200 can include a merge component 206 that can aggregate the one or more portions into a single file. For example, a first portion, a second portion, and a third portion (or subsequent portions) of the video can be tagged by annotation component 202. Each portion can have the same duration or a different duration. Further, each portion can have the same or different identifying information. In the case where two or more portions are not contiguous, merge component 206 can stitch each portion together (e.g., the second portion begins at about the same time the first portion stops, the third portion begins at about the same time that the second portion stops, and so forth). The portions can be stitched together in such a manner that markers, provided by indicator module 204, that correspond to respective sections can allow a viewer to identify each portion of the single file.

Figure 3:
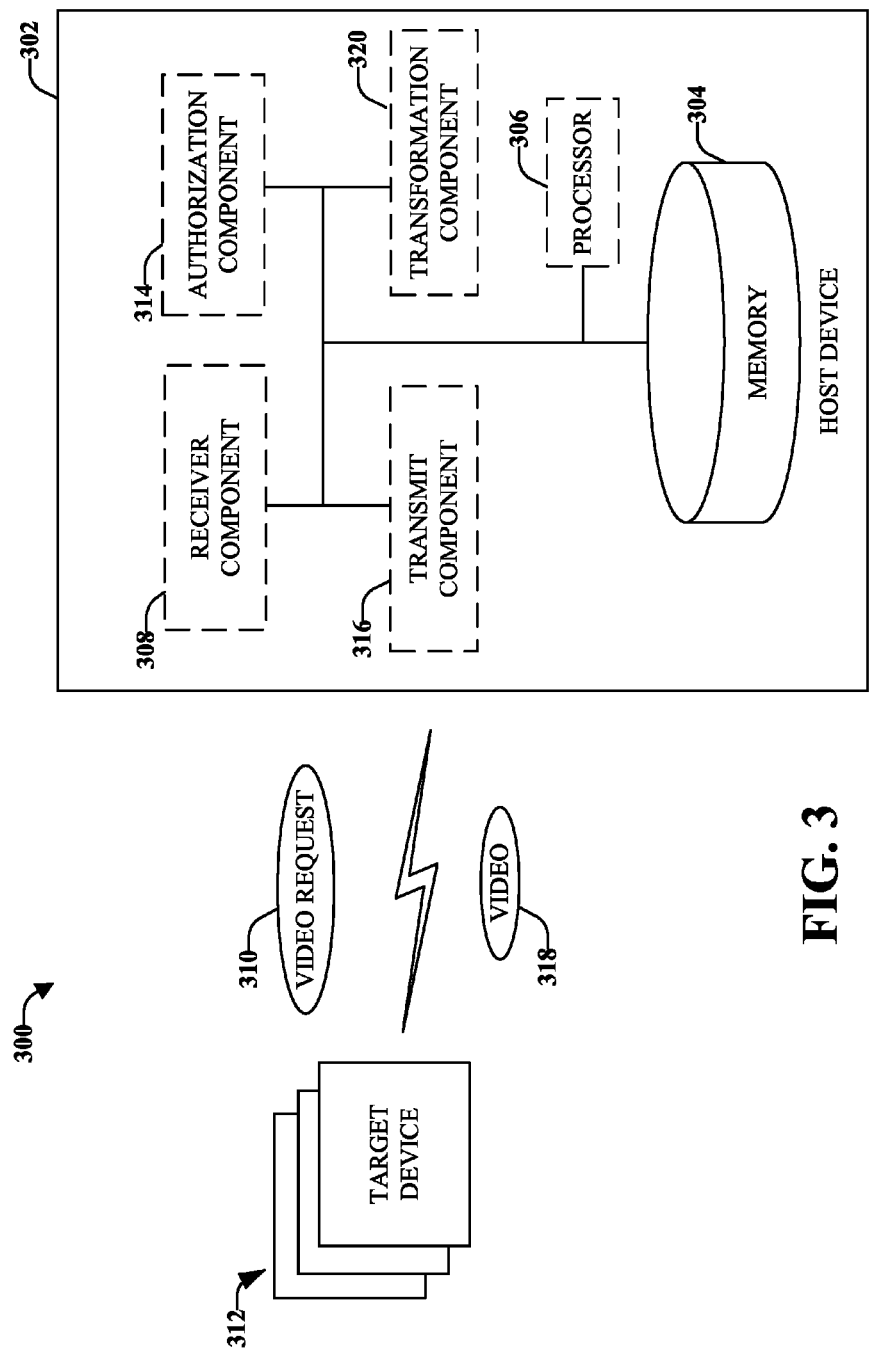
FIG. 3 illustrates an example non-limiting system that can convey a video in a format that is ready for immediate download at a target device, according to an embodiment.

FIG. 3 illustrates an example non-limiting system 300 that can convey a video in a format that is ready for immediate download at a target device, according to an embodiment. System 300 can be included, at least partially, on a host device 302. Host device 302 can include a memory 304 that stores computer executable components and instructions. Host device 302 can also include a processor 306 that executes the computer executable instructions stored in the memory 304. It should be noted that although one or more computer readable components may be described herein and illustrated as components separate from memory 304, in accordance with various embodiments, the one or more computer executable components could be stored in the memory 304.

The host device 302 can include a receiver component 308 that can receive a video request 310 from a target device 312. In accordance with some embodiments, similar video requests (e.g., for the same video) are received from two or more target devices. In other embodiments, different video requests (e.g., for different videos) are received from one or more target devices.

At about the same time as the video request 310 is received, an authorization component 314 determines whether the target device 312 that submitted the video request 310 can have access to the requested video. The ability to access the video can be determined by the authorization component 314 based on an identification of the target device. For example, the video can be received from a client device (e.g., user device 102 of FIGS. 1 and 2). Information related to the devices (e.g., target device 312) that can access the video content can be associated with the received video. For example, a video might pertain to a camping trip and the person that submitted the video might only want the video to be viewed by friends or users tagged in the video. Thus, the video is submitted with information as to the identification of friends or users that can view the video. Identification of the target device can be performed based on information that is broadcast from the target device. If the target device is not authorized to view the video, an error message can be conveyed to the user of the target device (e.g., through a prompt rendered on the target device).

If the authorization component 314 determines that the target device 312 can access the video, a transmit component 316 streams the video 318 to the target device 312. In one implementation, at about the same time as the video 318 is being streamed to the target device 312, a transformation component 320 transcodes the video 318. For example, the video might not have been transcoded at substantially the same time as (or before) the video was conveyed to host device 302 (as discussed with reference to FIGS. 1 and 2). Thus, the video should be transcoded before the video is conveyed to the target device. This can save time and other resources on the target device because the video does not need to be transcoded at the target device (e.g., is available for immediate download).

Figure 4:
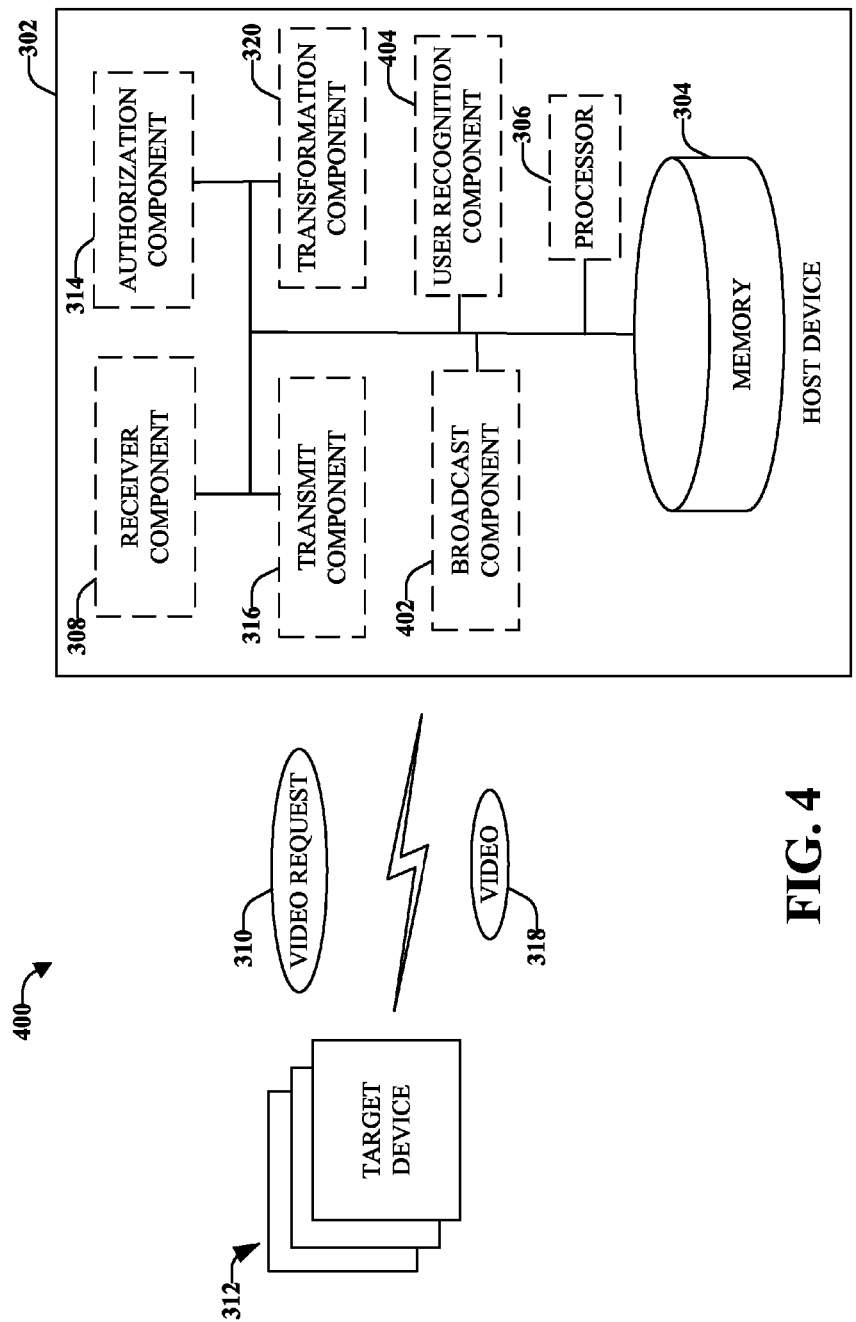
FIG. 4 illustrates a system that broadcasts video availability information, according to an embodiment.

FIG. 4 illustrates a system 400 that broadcasts video availability information, according to an embodiment. The video availability information can provide information about the video to an individual (or to one or more sets of individuals) that might be interested in the video. System 400 can include a broadcast component 402 that advertises availability of downloadable content to a set of individuals (e.g., to a set of target devices 312). In an embodiment, broadcast component 402 can selectively convey information to one or more individuals (or sets of individuals) notifying those individuals (e.g., through respective user devices) that a download is available. In order to convey the information to the individuals, system 400 can include a user recognition component 404 that identifies the individuals based on information received with the video (e.g., from a user device 102). The user recognition component 404 can retain the listing of individuals in a database or other retrievable format.

For example, the advertisement can be a selective advertisement, wherein the set of individuals are selected as a function of at least one configurable parameter. The configurable parameter(s) can include a listing of individuals that can access the video and such access can be limited by the author of the video (e.g., via a user device 102). The notifications can be conveyed to identified individuals (e.g., friends, a study group, and so forth), to a larger group of individuals (e.g., all students at the college), or to the public wherein anyone can gain access to the video as identified by, for example, the uploading user.

According to another embodiment, broadcast component 402 can convey information to all devices. For example, the advertisement can be a public advertisement and the set of individuals can represent all devices capable of receiving the advertisement.

Figure 5:
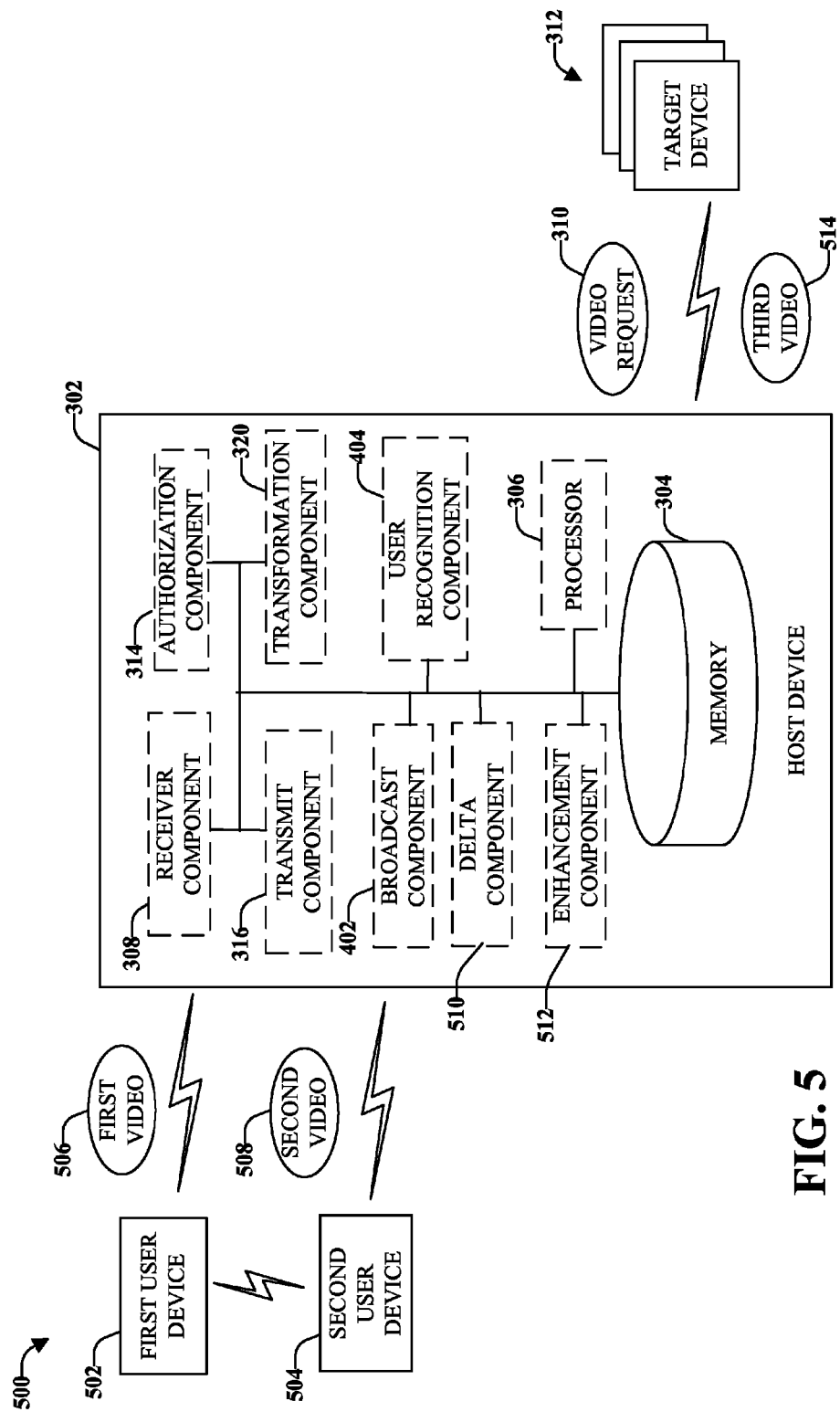
FIG. 5 illustrates an example, non-limiting system for enhancing a video that is available for immediate download, according to an embodiment.

FIG. 5 illustrates an example, non-limiting system 500 for enhancing a video that is available for immediate download, according to an embodiment. System 500 can facilitate videoconferencing (sometimes referred to as video chats), wherein individuals can communicate through nearly simultaneous two-way video and audio transmissions. Each user can capture the video chat from their viewpoints (e.g., through respective user devices). For example, respective users of a first user device 502 and a second user device 504 can be involved in a video chat. The first user device 502 can record what is being displayed on the device and the corresponding audio. In a similar manner, the second user device 504 can record what is being displayed on the device and the corresponding audio. The video chat captured by each user device can be conveyed to the host device 302.

The receiver component 308 receives a first video 506 from the first user device 502 and a second video 508 from the second user device 504. The first video 506 and the second video 508 can represent alternative views of a single event (e.g., of the same video conference call). In some embodiments, the first video and/or the second video are transcoded at substantially the same time the videos are conveyed to the host device 302. However, in accordance with some embodiments, one or more of the videos are not transcoded while being streamed to the host device 302.

Host device 302 includes a delta component 510 that identifies differences between the first video 506 and the second video 508. For example, the differences can relate to the granularity of a document or screenshot presented in the videos, wherein the granularity of the first video 506 is better than the granularity of the second video 508 in this example. In another example, the audio captured by the first user device 502 might be distorted (e.g., due to background noise) during a segment of the first video 506. However, the same segment of the audio captured by the second user device 504 might not contain the background noise, wherein this difference is identified by the delta component 510.

Also included in host device 302 of FIG. 5 is an enhancement component 512 that creates a third video as a result of the identified differences. The third video 512 can be an enhanced version of a combination of the first video 506 and the second video 508. Continuing the above examples, the third video 512 can include the document rendered on the first video and the segment of the audio as captured by the second user device (e.g., discarding the document from the second video and the audio segment captured by the first user device).

The third video 514 can be available for downloading to various target devices 312 at substantially the same time as the third video 514 is transcoded, as discussed herein. Thus, video chats can be recorded in such a manner that the downloaded version of the video chat (e.g., third video) has a better quality than the information that is displayed on the devices rendering the individual videos during the video chat (e.g., user device, cell phone, and so on).

Figure 6:
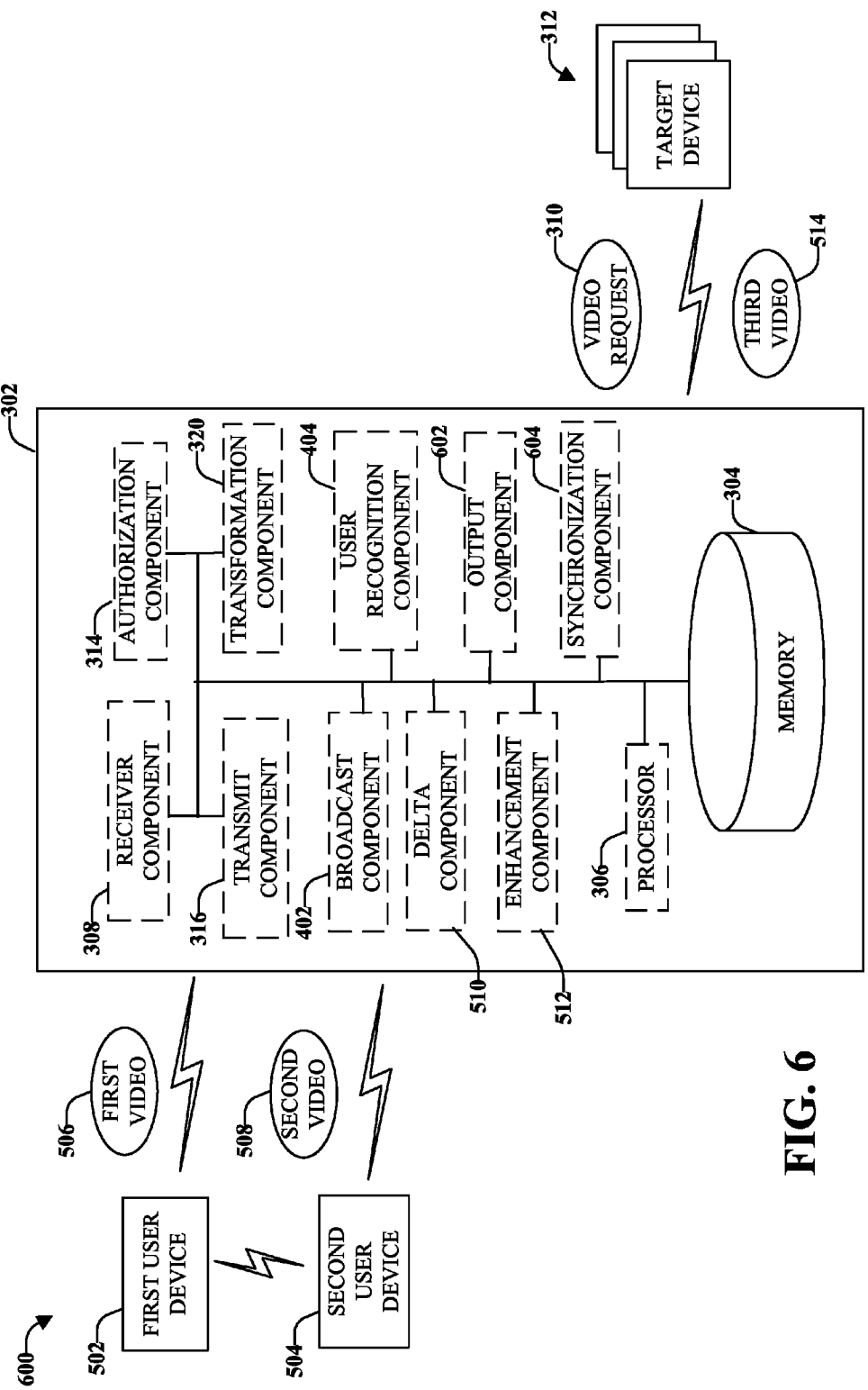
FIG. 6 illustrates an example, non-limiting system that provides alternative views of a video in a format that is ready for immediate download, according to an embodiment.

In some embodiments, alternative views of the video chat can be made available in the downloaded version. FIG. 6 illustrates an example, non-limiting system 600 that provides alternative views of a video in a format that is ready for immediate download, according to an embodiment.

Similar to the above, the receiver component 308 receives a first video 506 from a first user device 502 and a second video 508 from a second user device 504, wherein the first video 506 and the second video 508 capture alternative views of a single event (e.g., a video chat or a remote hosting session). In one implementation, enhancement component 512 creates a third video 514 by combining the first video 506 and the second video 508 in a split-screen format (e.g., side-by-side, top-to-bottom). For example, frames of the first video 506 can be on a left side of the third video's frames and frames of the second video 508 can be on a right side of the third video's frames. An output component 602 can output the third video 514, providing the split-screen format. In one implementation, the output component 602 renders the alternative views on a display of the target device(s) 312 in a split-screen format, without a third video being generated by the host device. For example, a first video can be displayed on a top portion of the display and the second video can be displayed on a bottom portion of the display. In another example, the first video is displayed on the right hand side of the display and the second video is displayed on a left hand side of the display.

Also included is a synchronization component 604 that harmonizes the alternative views. The alternative views can be harmonized by the synchronization component 604 based on audio tracks associated with each of the first video 506 and the second video 508. In another example, the harmonization can be facilitated by the synchronization component 604 based on the recognition of events that occur in each video (e.g., detected movement, an event occurring, and so forth). The harmonization allows for continuity between the multiple videos when viewed in the split-screen format.

Figure 7:
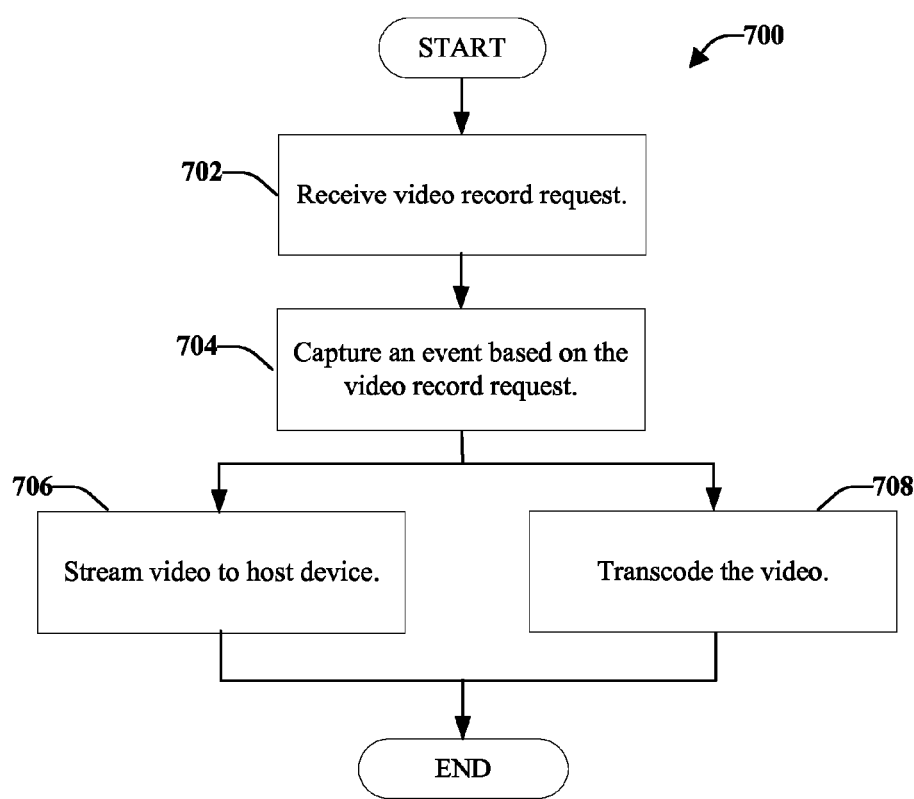
FIG. 7 illustrates an example non-limiting method for providing concurrent transcoding of a streaming video, according to an embodiment.

FIG. 7 illustrates an example non-limiting method 700 for providing concurrent transcoding of a streaming video, according to an embodiment. While, for purposes of simplicity of explanation, the methods are shown and described as a series of acts, the disclosed subject matter is not limited by the order of acts, as some acts may occur in different orders and/or concurrently with other acts from that shown and described herein. For example, those skilled in the art will understand and appreciate that a method can alternatively be represented as a series of interrelated states or events, such as in a state diagram. Moreover, not all illustrated acts may be required to implement a method in accordance with the disclosed subject matter. Additionally, it is to be appreciated that the methods disclosed in this detailed description are capable of being stored on an article of manufacture to facilitate transporting and transferring such methodologies to computers or other computing devices.

Method 700 starts, at 702, when a video record request is received (e.g., using a communication component 108). The video record request can be received from a user device, for example. At 704, a video is captured (e.g., using a capture component 112). The video can be of a remote hosting session or a video chat (e.g., an active video chat), for example. The video can be of an event indicated by a video record request.

At 706, the video is streamed to a host device (e.g., using a transfer component 118). The video is streamed to the host device in order for the video to be readily accessible by target devices (or by the user device that captured the video). In one example, users of the target devices might not have been present at the event captured in the video (e.g., the appearance of a deer on a trail); however, there is a desire for those users to have access to the video.

At least a portion of the video is transcoded at 708 (e.g., using a conversion component 124). The video can be transcoded at substantially the same time as the video is streamed to the host device. The almost simultaneous streaming and transcoding of the video allows the video to be available for immediate download at one or more target devices. For example, in one example, a remote hosting session is open between a first device and an associated second device. The remote hosting session provides a video feed of the second device's screen to the first device. A user of the first or second device can trigger recording of the active remote hosting session or a part thereof. As the recording is occurring, the recording is streamed to a content hosting device and substantially simultaneously transcoded (e.g., by a computer coupled to the content host device) so as to make the recording available to one or more target devices relatively immediately. In another implementation, the appearance of a deer on a trail triggers video capture, transcoding of the video, and substantially simultaneous streaming of the transcoded video to a content host device for immediate download availability to a target device (e.g., a mobile phone or tablet). The availability of the video can be transmitted to the target device, e.g., via a push notification to the target device.

In accordance with some embodiments, one or more portions of the video can be bookmarked (e.g., using an annotation component 202). The bookmark(s) can identify one or more portions of the video that are to be transcoded. At 708, only the one or more portions of the video that are bookmarked are transcoded (e.g., using the conversion component 124). Thus, portions of the video that are not bookmarked are not transcoded at substantially the same time as the video is streamed to the host device. The bookmarking of the video can be utilized to identify noncontiguous portions of the video and the method 700 can include aggregating the one or more portions of the video into a single file (e.g., using a merge component 206).

Method 700 can also include distinguishing a first portion of the one or more portions from a second portion of the one or more portions (e.g., using an indicator module 204). The first portion and the second portion can be contiguous portions of the video or can be noncontiguous portions of the video. For example, the portions can be distinguished based on information that identifies the contents of each portion.

Figure 8:
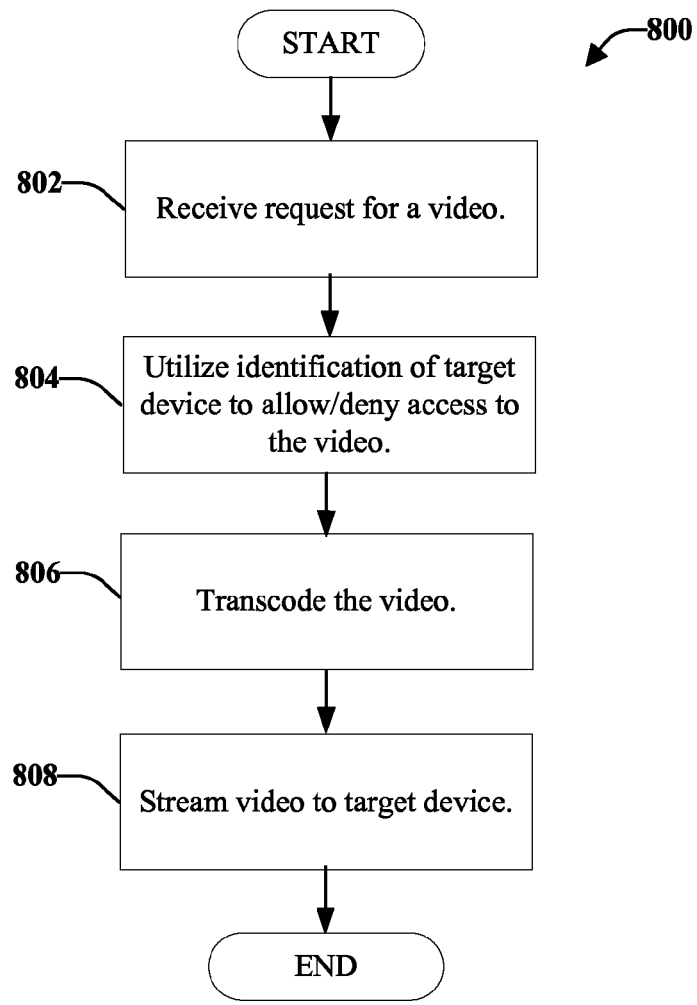
FIG. 8 illustrates another example, non-limiting method that can convey a video in a format that is ready for immediate download at a target device, according to an embodiment.

FIG. 8 illustrates another example, non-limiting method 800 that can convey a video in a format that is ready for immediate download at a target device, according to an embodiment. Method 800 starts, at 802, when a request for a video is received from a target device (e.g., using a receiver component 308). The request can be for a video that is stored in memory and/or a video that can be readily accessed. The request can include an identification of the video (e.g., name of the video, location of the video, and so forth).

At 804, identification of the target device is utilized to selectively allow access to the video (e.g., using an authorization component 314). For example, the identification of the target device can include determining an authorization level associated with the target device, wherein the authorization level is defined by an author of the video.

If the target device is authorized to access the video, at 806 the video is transcoded (e.g., using a transformation component 320) and then streamed, at 808, to the target device (e.g., using a transmit component 316). The transcoding of the video before (or at substantially the same time as) streaming of the video allows the video to be available for immediate download at the target device (e.g., without a second transcoding at the target device). The transcoding can include transcoding portions of the video that are tagged and the portions of the video that are tagged can be merged to create a single file. The portions of the video that are tagged can be contiguous portions or non-contiguous portions of the video.

In an embodiment, the method 800 includes advertising availability of downloadable content to a set of target devices (e.g., using a broadcast component 402). The advertisement can be a public advertisement and the set of individuals can represent all devices capable of receiving the advertisement. In accordance with some embodiments, the advertisement is a selective advertisement, wherein the set of individuals are selected as a function of at least one configurable parameter.

In another embodiment, the method can include receiving a first video from a first user device and a second video from a second user device (e.g., using a receiver component 308). The first video and the second video can represent alternative views of a single event (e.g., of a video chat). Differences between the first video and the second video can be identified (e.g., using a delta component 510) and a third video can created as a result of the identified differences (e.g., using an enhancement component 512). The third video can be an enhanced version of a combination of the first video and the second video.

In accordance with some embodiments, the alternative views can be rendered in a split-screen format on the target device (e.g., using an output component 602). Further, the alternative views can be harmonized (e.g., using a synchronization component 604), wherein the rendering includes displaying the alternative views in the split-screen formation so that the alternative views are harmonized.

Figure 9:
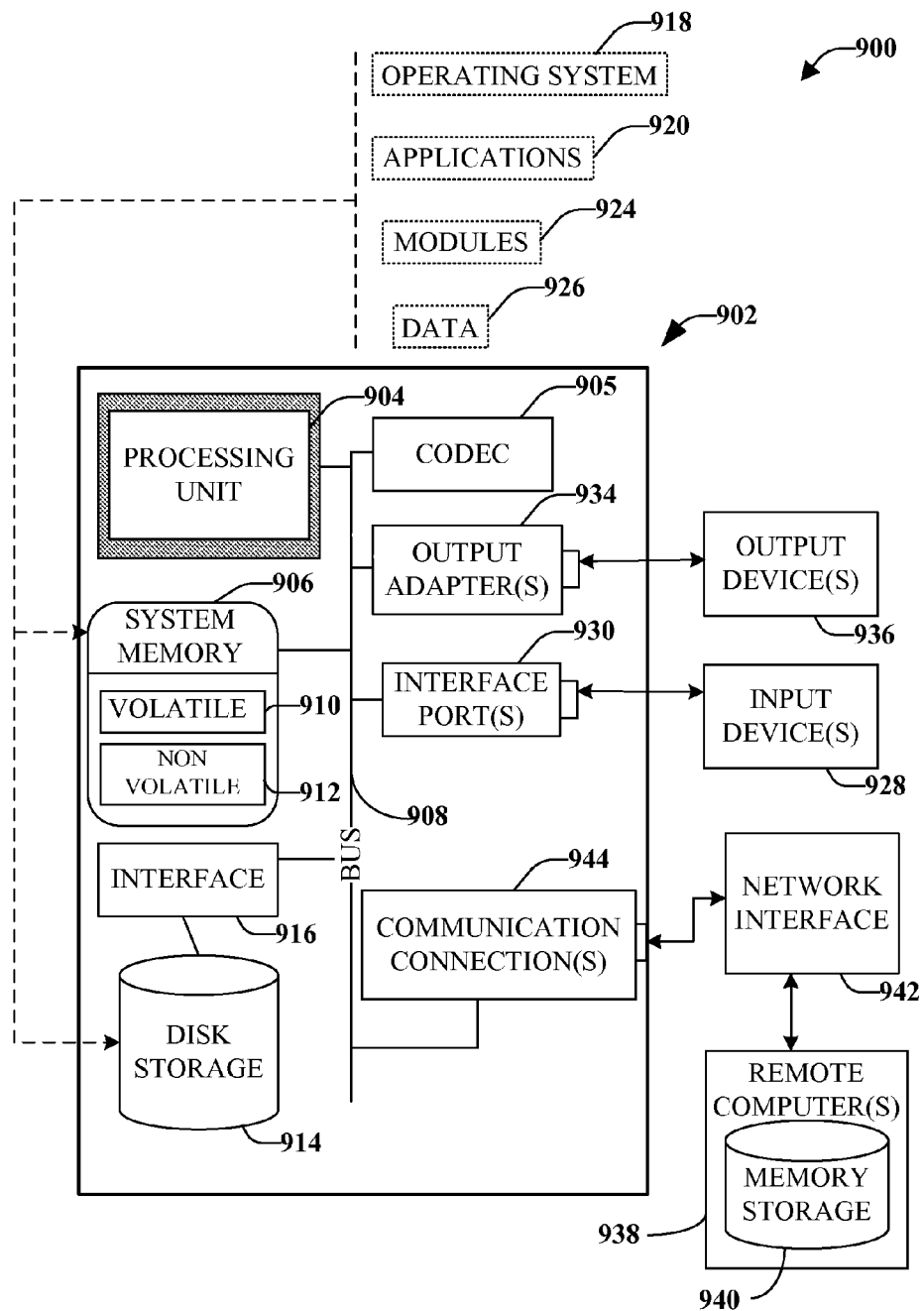
FIG. 9 illustrates a block diagram representing an exemplary non-limiting networked environment in which various embodiments can be implemented.

With reference to FIG. 9, a suitable environment 900 for implementing various embodiments of the disclosed subject matter includes a computer 902. The computer 902 includes a processing unit 904, a system memory 906, a codec 905, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to an embodiment, codec 905 may include at least one of an encoder or decoder, wherein the at least one of an encoder or decoder may consist of hardware, a combination of hardware and software, or software. Although, codec 905 is depicted as a separate component, codec 905 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to various embodiments, the volatile memory may store write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices such as a magnetic disk drive, solid state disk (SSD) floppy disk drive, tape drive, Jaz drive, Zip drive, LS-70 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface can be used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer 902. Applications 920 take advantage of the management of resources by operating system 918 through program modules 924, and program data 926, such as boot/shutdown transaction table and the like, stored either in system memory 906 or on disk storage 914. It is to be appreciated that the disclosed embodiments can be implemented with various operating systems or combinations of operating systems.

A user enters commands or information into the computer 902 through input device(s) 928 (e.g., a user interface). Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 such as monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938 (e.g., a family of devices). The remote computer(s) 938 can be a personal computer, a server, a router, a network PC, a workstation, a microprocessor based appliance, a peer device, a smart phone, a tablet, or other network node, and can includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks such as Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
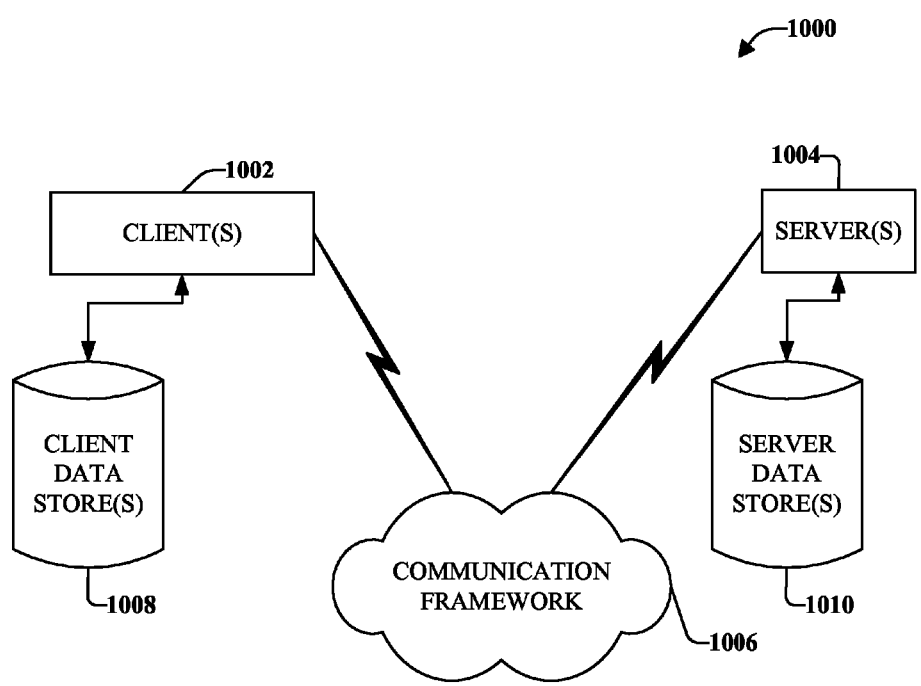
FIG. 10 illustrates a block diagram representing an exemplary non-limiting computing system or operating environment in which various embodiments may be implemented.

Referring now to FIG. 10, there is illustrated a schematic block diagram of a computing environment 1000 in accordance with the disclosed embodiments. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include metadata, such as associated contextual information for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 include or are operatively connected to one or more client data store(s) 1008 that can be employed to store information local to the client(s) 1002 (e.g., associated contextual information). Similarly, the server(s) 1004 operatively include or are operatively connected to one or more server data store(s) 1010 that can be employed to store information local to the servers 1004.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject disclosure. Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of various embodiments. It is, of course, not possible to describe every conceivable combination of components or methodologies for purposes of describing the one or more aspects, but it is to be appreciated that many further combinations and permutations of the various aspects are possible. Accordingly, the subject disclosure is intended to embrace all such alterations, modifications, and variations. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosed illustrated exemplary aspects of the disclosed subject matter. In this regard, it will also be recognized that the aspects include a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art. Although the components described herein are primarily described in connection with performing respective acts or functionalities, it is to be understood that in a non-active state these components can be configured to perform such acts or functionalities.

In addition, while a particular feature may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component", "module", "system", or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific functions; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, for example, via access requests, queries, or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, for example, a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In addition, while a particular feature of the disclosed aspects may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:
1. A device, comprising:
   a memory that stores computer executable components; and
   a processor that executes the following computer executable components stored in the memory:
   a communication component for receiving a video record request;
   a capture component for recording a video of a live event indicated by the video record request;
   a transfer component for streaming at least a portion of the video to a host device as the video is being recorded;
   an annotation component for:
      identifying one or more portions of the video to be transcoded based on at least one of plurality of identifying parameters, wherein each identified portion of the video to be transcoded has the same duration; and
      tagging each identified portion of the video to be transcoded with markers that indicate where to start and stop the transcoding of the identified portion of the video; and
   a conversion component for:
      transcoding only the identified one or more portions of the video into a format supported by a target device, the transcoding being concurrent to the streaming of the at least the portion of the video to the host device, wherein the target device is different from the host device, and only the transcoded portions of the video are for downloading at the target device.

2. The device of claim 1, wherein the plurality of identifying parameters include at least one of: user input, user preference, keywords and phrases describing content of the video, and identification of one or more human speakers in the video.

3. The device of claim 1, further comprising:
a merge component for combining one or more transcoded portions of the video into a single file, each transcoded portion in the single file being identified by at least one marker indicating start of the transcoded portion.

4. A device, comprising:
a memory that stores computer executable components; and
a processor that executes the following computer executable components stored in the memory:
a receiver component for receiving a first video from a first user device and a second video from a second user device, wherein the first video and the second video represent alternative views of a common event;
a delta component for identifying audio and visual differences between the first video and the second video;
an enhancement component for:
synchronizing the first video and the second video based on at least one of audio tracks associated with each of the first video and the second video and recognition of events that occur in each of the first video and the second video;
creating a third video based on the identified differences and synchronization of the first video and the second video combining the synchronized first video and second video displayed in a split-screen format, wherein the third video is an enhanced version of a combination of the first video and the second video, and wherein continuity is provided when reviewing the synchronized first video and the second video displayed in the split-screen format;
a communication component for streaming the third video to a target device in response to a request for a video related to the event from the target device; and
a transformation component for transcoding the third video into a format supported by the target device concurrently with the third video being streamed to the target device.

5. The device of claim 4, wherein the event is a video chat and the first user device and the second user device are operated by different entities.

6. The device of claim 4, wherein the enhancement component combines frames of the first video with an audio segment of the second video temporally corresponding to the frames of the first video to form the third video.

7. The device of claim 6, wherein the frames of the first video are of higher visual quality than temporally corresponding frames of the second video.

8. The device of claim 6, wherein the audio segment of the second video is of higher audio quality than a temporally corresponding audio segment of the first video.

9. A method, comprising:
receiving, by a system including a computer processor, a first video from a first user device and a second video from a second user device, wherein the first video and the second video represent alternative views of a common event;
identifying, by the system, audio and visual differences between the first video and the second video;
synchronizing, by the system, the first video and the second video based on at least one of audio tracks associated with each of the first video and the second video and recognition of events that occur in each of the first video and the second video;
creating, by the system, a third video based on the identified differences and synchronization of the first video and the second video by combining the synchronized first video and second video displayed in a split-screen format, wherein the third video is an enhanced version of a combination of the first video and the second video, and wherein continuity is provided when reviewing the synchronized first video and the second video displayed in the split-screen format;
streaming, by the system, the third video to a target device in response to a request for a video related to the event from the target device; and
transcoding the third video to a format supported by the target device concurrently with the third video is streamed to the target device.

10. The method of claim 9, wherein the third video comprises frames of the first video with an audio segment of the second video temporally corresponding to the frames of the first video.

11. The method of claim 9, wherein the frames of the first video are of higher visual quality than temporally corresponding frames of the second video.

12. The method of claim 9, wherein the audio segment of the second video is of higher audio quality than a temporally corresponding audio segment of the first video.

13. A method, comprising:
receiving, by a first device comprising a computer processor, a video record request;
recording, by the first device, a video of a live event in response to the video record request;
streaming, by the first device to a host device, at least a portion of the video as the video is being recorded; and
identifying one or more portions of the video to be transcoded based on at least one of plurality of identifying parameters, wherein each identified portion of the video to be transcoded has the same duration;
tagging each identified portion of the video to be transcoded with markers that indicate where to start and stop the transcoding of the identified portion of the video; and
transcoding, by the first device, only the identified one or more portions of the video into a format supported by a target device, the transcoding being concurrent to the streaming of at least the portion of the video to the host device, wherein the target device is different from the host device and only the transcoded portions of the video are for downloading at the target device.

14. The method of claim 13, wherein the plurality of identifying parameters include at least one of: user input, user preference, keywords and phrases describing content of the video, and identification of one or more human speakers in the video.

15. The method of claim 13, further comprising combining one or more transcoded portions of the video into a single file, each transcoded portion in the single file being identified by at least one marker indicating start of the transcoded portion.

* * * * *